Patented Oct. 9, 1951

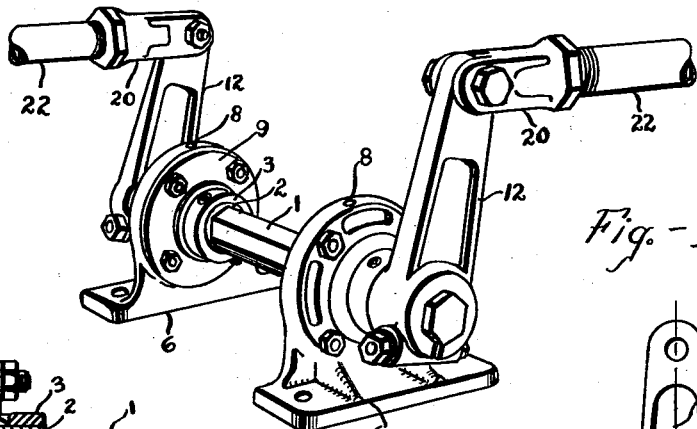
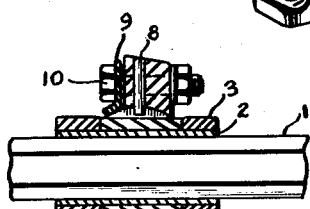
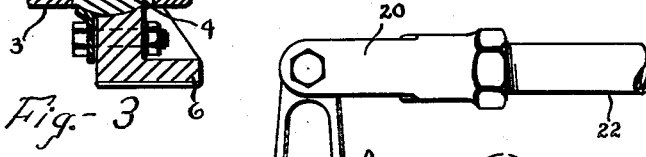
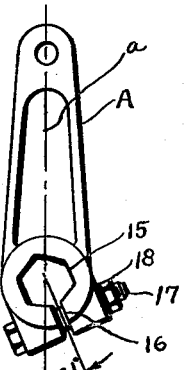
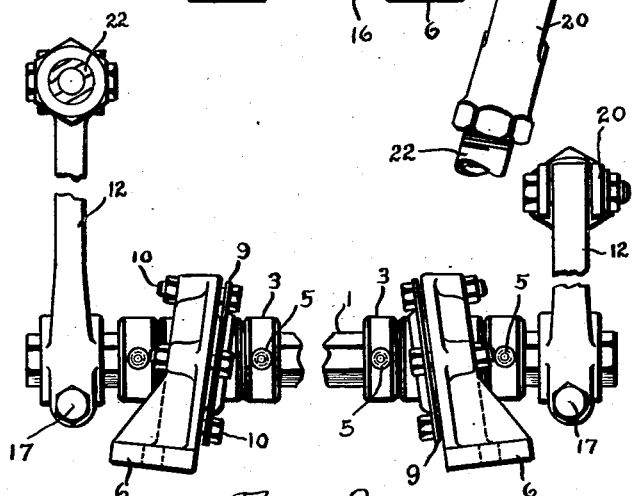
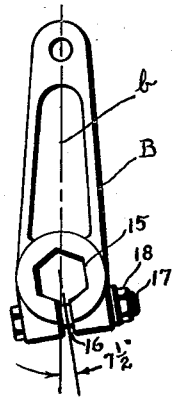

2,570,702

UNITED STATES PATENT OFFICE 2,570,702

MECHANICAL LINKAGE

John F. Morse, Hudson, Ohio

Application July 5, 1946, Serial No. 681,528

3 Claims. (Cl. 74—559)

The present invention relates to devices by which two machines or machine elements may be readily connected so that the operation of the machines may be properly coordinated. It frequently occurs, in connecting two mechanical devices where the operation of one device controls or is to be coordinated with the operation of the other, that considerable adjusting of the connecting mechanism is required to secure accurately timed relationship between them. The object of the present invention is to provide a mechanical linkage which is easily adapted to any situation where there is the problem of coordinating two diverse machines or machine elements.

While, as indicated above, the invention may be adaptable for many and varied uses, it was developed to meet the requirements of boat builders and marine engine dealers for a simple and effective control between the pilot house and the engine room, and for this reason many of the features of the invention have especial utility for marine installations.

The mechanism which is shown and described herein consists of a main connecting shaft upon which are mounted two crank arms, each of which is connected to one of the machines or machine elements. With the device shown herein, it is a simple matter to connect a machine and its control mechanism or two machines so that they will function together properly. The device gives a rough adjustment over a full circle so as to take care of any conceivable situation.

The invention also contemplates mounting the connecting shaft in self aligned bearings which permit the mounting of the linkage in places where the supporting surfaces are out of level without cramping the shaft. The connecting shaft is preferably hexagonal in cross-section so that the links may be mounted thereon without the use of keys and machining necessary with the ordinary round shafts. Such common causes of trouble as misalignment of bearings, rusted and dry bearings and link pins and backlash due to loose shaft keys have been eliminated, and this is peculiarly valuable in situations to which the invention is especially adapted.

The invention is shown in its best known and preferred form, but the exact details which are shown and described are not essential and may be varied without departing from the principles of the invention or sacrificing any of its benefits.

In the drawings:

Fig. 1 is a perspective view of an actual commerical embodiment of the invention. In this view the two crank arms are shown in the same angular relation to the connecting shaft, or at 0° setting.

Fig. 2 is a side elevation of the link mechanism showing the manner in which the bearings with the supporting brackets permit the device to be mounted on angularly disposed surfaces without adversely affecting the operation.

Fig. 3 is a section along the shaft at one of the bearings.

Fig. 4 is an end elevation of the device, the full lines showing an angular setting of one arm at 105° with respect to the other. The dotted lines show two other settings of 60° and 270° of the rear arm with respect to the vertical arm. In all cases the degrees are given in a clockwise direction.

Fig. 5 is a side view of one of the crank elements.

Fig. 6 is a side view of the other crank element.

In connecting the machines or machine elements with this device, a complete range of 360° is provided for, and in the form of the invention shown, there is obtainable any one of twenty-four different angular settings which, under ordinary circumstances, will give a sufficiently accurate adjustment. If a finer adjustment is required, it may be made by varying the effective length of one or both of the connecting links.

The numeral 1 indicates the main or connecting shaft which, in the form shown, is preferably made from a standard hexagonal bar stock. This cross-section has been selected for illustration because it gives an even number of degrees and in conjunction with the design of crank arms shown permits of regular 15° intervals in the angular settings of the crank arms. It is within the scope of the invention to adopt any polygonal cross-section for the main shaft and any variety of crank arms whereby even finer divisions of the circle may be attained.

The shaft 1 is mounted in two bearing sleeves 2, the interiors of which are hexagonal to fit the shaft 1 and the exteriors of which are round to rotate within the bearing members to be described. On the ends of each sleeve are the two collars 3, held by set screws 5, and between these collars is located the bearing member 4, preferably made of oil-retaining, porous bronze, the exterior surface of which is spherical except for a longitudinal key slot shown in Fig. 3. Each bearing member is mounted in the rounded seat formed in a bracket 6. The seat is flared sufficiently so that the bearing member may be entered into its position in the bracket, and a key pin 8 passed through the bearing housing engages the key slot.

At the open side of each bearing seat is an annular spring clamping plate 9, the inner edge of which is flared outwardly so as to fit about the surface of the bearing member 4.

Bolts 10 draw the ring 9 against the bearing member to hold the bearing member in its seat without inhibiting its rocking movement therein.

Fig. 2 illustrates one purpose of the rocking bearing for the two ends of the shaft, for it shows how the two brackets may be tilted while the shaft 1 is maintained in horizontal position without interfering with the free rocking motion of the shaft. Not only does this particular method of mounting the shaft 1 permit of easy installation on surfaces such as the bottom of a boat, but it relieves the shaft of any strain due to the warping of the boat. To enhance the freedom of movement of the shaft in service, the set screws 5 for one pair of collars may be backed off and out of contact with the shaft and the shaft will be held sufficiently by the other pair of collars.

The arrangement shown has many advantages in marine engineering for it not only dispenses with the usual blocking up of a surface to receive the shaft, but it also allows for sufficient freedom of movement so that the shaft turns easily with its sleeves in the two bearing members.

The ends of the shaft 1 project at either side of the brackets to receive the crank arms referred to. In the form of the invention illustrated, there are two forms or styles of crank arms, indicated collectively at 12. One form or style is indicated by the letter A and the other by the letter B. Each crank arm is formed at the base with a socket 15 which is the shape of the selected cross-section of the shaft 1, and the arm is split at this point by a cut 16 across which extends the bolt 17 having a nut 18 thereon by which the split socket may be drawn into close clamping relation about the end of the shaft. The arm of each crank is pivotally connected to a clevis 20, the central portion of which is formed with a screw-threaded socket to receive the threaded end of a link 22 which is connected to one of the machines or machinne elements. This threaded connection is the means by which any finer adjustments may be made if the main adjustment permitted by the crank mechanism is not sufficiently accurate.

It will be noted that in the case of both styles of crank arm A or B, the center line of the crank arm is not coincident with a radius of the socket 15, but is offset or angularly displaced therefrom. In style A the center line a does not pass through an apex of the hexagon, but is 22½° to one side thereof. In style B the center line of the crank is offset at 7½°. This particular angular offsetting has been selected because in the form shown two reversible crank arms of each style are employed with a hexagonal connecting shaft, and the sum or difference of the angular setting of any two arms is an aliquot part of 60.

It will be noted that each arm may be reversed or turned over. Thus, if the arm shown in Fig. 5 is fitted over the shaft in the position shown, the angular deflection is 22½° to the right of the nearest apex of the socket, whereas if the arm is turned over, the deflection of 22½° will be to the left of this point.

Variations in the angular settings of the crank arms at the two ends of the shaft 1 may be obtained within one 60° arc by the proper selection of arms A and B and by reversing the arms if necessary. By a permutation of the arms and their settings, it is possible to obtain any one of twenty-four settings in the form of the invention shown, for in each case the total angular displacement will be either the sum or the difference of 7½ and 22½° plus any 60° increment due to placing the arms in different positions about the shaft.

In an arc of 60°, four angular settings may be obtained, as shown by the following schedule:

0° angular setting—two arms A or B faced alike.
15° angular setting—A or B faced alike, or B and B reversed.
30° angular setting—A and B reversed.
45° angular setting—B and B reversed, or A and A reversed, but spaced 60° about the central shaft.

A full 60° angular displacement or any multiple thereof is obtained by using two A or two B style crank arms faced alike but with one of the arms shifted to another position around the center shaft. By following this system around the shaft, the complete circle may be covered.

Thus, for the 105° setting shown in full lines in Fig. 4, the operator would select one arm A and for the second arm he would select an arm of the B type and face the arms in the same direction. For the 60° setting shown in dotted outline at x in Fig. 4, he might use two arms of either style and face them in the same direction. For the 270° shown in the dotted outline y, he would employ arms A and B but reversely faced.

Sufficient description has been given so that the invention and its usefulness in the general mechanical arts may be understood. Employing the invention either in the form shown or in modifications thereof, any angular relationship between two crank arms may be readily attained by various permutations of arm setting. By placing the arms at various positions on the shaft and by facing them in the same or opposite directions, the angular displacements may be added or subtracted from each other to arrive at any one of twenty-four settings in the form shown.

For marine work the various elements of the device are made from stainless and corrosion-proof metals. The mechanical linkage here shown permits the installation of mechanical equipment without the necessity of drawings, machine work or fabrication on the spot. At the same time it eliminates the usual defects and annoyances found in making installations of all types and particularly in the construction and operation of power craft of all types.

What is claimed is:

1. A mechanical linkage comprising a connecting shaft polygonal in cross-section, means for mounting said shaft for rotation, crank arms having sockets of like cross-section fitting over the shaft, said crank arms including at least two types, the center line of an arm of each type being offset angularly with respect to an apex of the socket and at a different angular relation with respect to a crank arm of another type, the sum or difference of angular offsetting of any two arms being divisible into the angular extent of one side of the shaft, and links connected to the ends of the crank arms.

2. A mechanical linkage comprising a connecting shaft hexagonal in cross-section, means for mounting the shaft for rotation, crank arms having hexagonal sockets fitting over the shaft, said crank arms being of at least two types, the center line of an arm of each type being offset angularly with respect to an apex of the socket and at a different angular relation with respect to a crank arm of another type, the sum or difference of angular offsetting of any two arms being an aliquot part of 60.

3. A mechanical linkage comprising a connecting shaft polygonal in cross-section, means for mounting the shaft for rotation, a plurality of crank arms having sockets fitting over the shaft and including at least two styles of arms, each style of arm having the center line thereof offset angularly with respect to an apex of the socket, the angular relationship of an arm of each style being different from the angular relationship of an arm of another style, the sum or difference of angular offsetting being an aliquot part of the number of degrees contained in one side of the socket.

JOHN F. MORSE.

REFERENCES CITED

The following references are of record in the file of this patent:

UNITED STATES PATENTS

| Number | Name | Date |
| --- | --- | --- |
| 553,477 | Spicer | Jan. 21, 1896 |
| 1,905,784 | Alsaker et al. | Apr. 25, 1933 |
| 2,167,230 | Avigdor | July 25, 1939 |